United States Patent [19]

Wade

[11] 4,239,598
[45] Dec. 16, 1980

[54] NUCLEAR REACTOR HEAT TRANSPORT SYSTEM COMPONENT LOW FRICTION SUPPORT SYSTEM

[75] Inventor: Elman E. Wade, Ruffs Dale, Pa.

[73] Assignee: The United States of America as represented by the United States Department of Energy, Washington, D.C.

[21] Appl. No.: 956,319

[22] Filed: Oct. 31, 1978

[51] Int. Cl.³ .............................................. G21C 13/04
[52] U.S. Cl. .......................................... 176/87; 176/38; 248/58; 403/121; 403/381
[58] Field of Search ............... 176/38, 40, 65, 87; 248/49, 58; 403/121, 381

[56] References Cited

U.S. PATENT DOCUMENTS

| | | | |
|---|---|---|---|
| T911,015 | 6/1973 | Garkisch et al. | 176/40 X |
| 1,392,810 | 10/1921 | Zifferer | 403/381 X |
| 3,411,813 | 11/1968 | Kreuz | 285/394 X |
| 3,625,818 | 12/1971 | Breidenbach et al. | 176/40 |
| 3,891,335 | 6/1975 | Feil | 403/381 X |
| 4,014,151 | 3/1977 | Erhart | 403/121 X |
| 4,172,010 | 10/1979 | Seed et al. | 176/87 |

*Primary Examiner*—Peter A. Nelson
*Attorney, Agent, or Firm*—James E. Denny; Richard G. Besha; Frank H. Jackson

[57] ABSTRACT

A support column for a heavy component of a liquid metal fast breeder reactor heat transport system which will deflect when the pipes leading coolant to and from the heavy component expand or contract due to temperature changes includes a vertically disposed pipe, the pipe being connected to the heavy component by two longitudinally spaced cycloidal dovetail joints wherein the distal end of each of the dovetails constitutes a part of the surface of a large diameter cylinder and the centerlines of these large diameter cylinders intersect at right angles and the pipe being supported through two longitudinally spaced cycloidal dovetail joints wherein the distal end of each of the dovetails constitutes a part of the surface of a large diameter cylinder and the centerlines of these large diameter cylinders intersect at right angles, each of the cylindrical surfaces bearing on a flat and horizontal surface.

7 Claims, 6 Drawing Figures

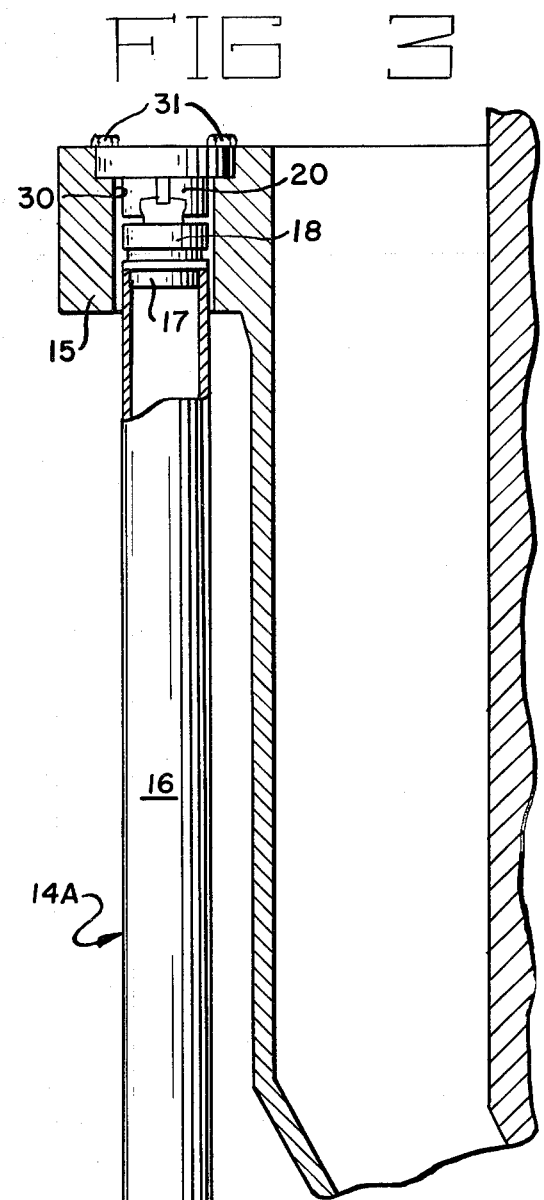
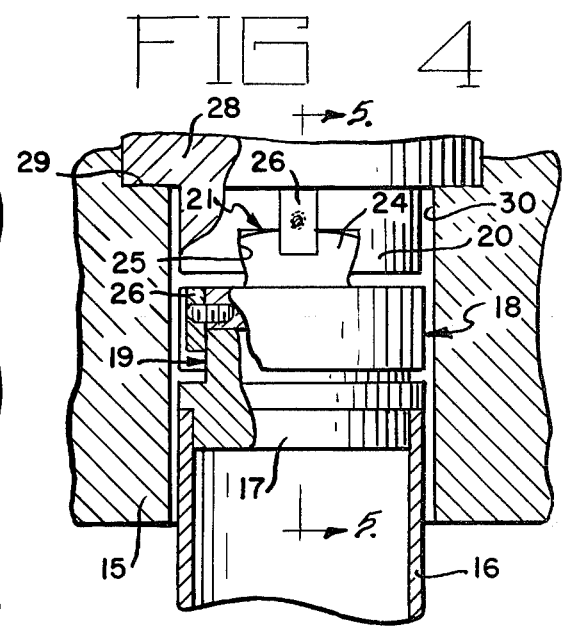
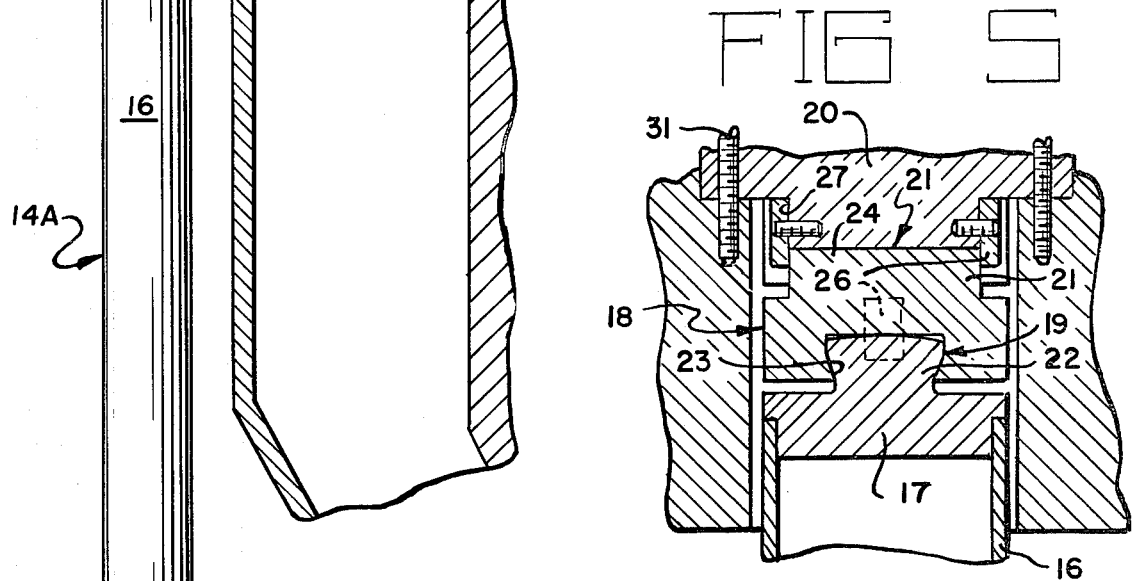
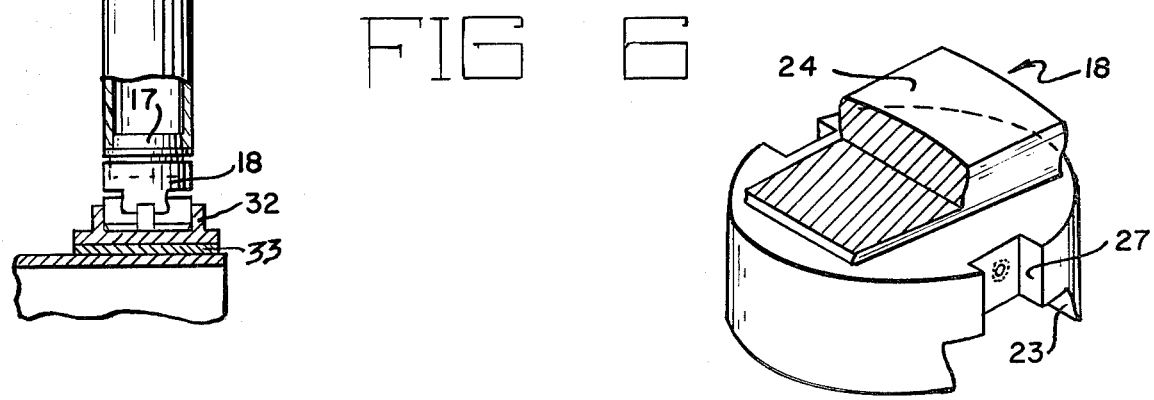

NUCLEAR REACTOR HEAT TRANSPORT SYSTEM COMPONENT LOW FRICTION SUPPORT SYSTEM

CONTRACTUAL ORIGIN OF THE INVENTION

The invention described herein was made in the course of, or under, a contract with the U.S. Department of Energy.

BACKGROUND OF THE INVENTION

In nuclear reactor heat transport systems, thermal expansion produces stress in the pipes which carry the reactor core coolant from the reactor to the pump and heat exchanger and thence back to the reactor. In conventional piped liquid metal fast breeder reactor (LMFBR) systems, the pipe runs are generally made in long loops and the pump and intermediate heat exchanger (IHX) are solidly fastened to the building structure. With this arrangement the long pipe is capable of deflections sufficient to permit the increase in the pipe length due to thermal expansion without producing unacceptably high stresses in the pipe, but the long pipe is expensive in pipe costs and building space. In the heat transport systems of water reactors, components such as the steam generator and pumps are mounted on columns having pivoted ends. A pivot consists of a clevis, a pin, and eye with a spherical bushing between the pin and eye. When all columns are vertical there exists little load on the pipes, but when a thermal change occurs that causes the pipes to push the components laterally, and the columns are no longer vertical, the loads on the pipes become large. The pipes are not excessively stressed because of their heavy wall, but a similar system for an LMFBR would be unacceptable because the pipe walls of an LMFBR must be relatively thin to avoid thermal stress fatigue of walls.

It has been desirable for some years to provide a system that would support the components of the LMFBR heat transport system, such as the pump and IHX, in a manner that would require only a small lateral force to move the component so that thin pipes could provide that force without excessive stress. There have been two problems with the design of such a system: (1) it must have very low friction and (2) it must have very low probability of a failure that causes the system to develop excessive friction loads. Under all likely events such as, for example, hydraulic electrical failure, the system must not develop large friction.

Several solutions to the above problems have been proposed. Some are given below:

1. Mount the component on very long columns with ball joints at the column ends. With this solution the columns must be quite long to reduce lateral loads under all conditions of component position to acceptable values. For example, if a 770,000 pound component were displaced 3.5" it would exert about 660 pounds on the pipe if it were mounted on 340 foot long columns.

2. Hang the component on very long tension members. The problem here is the same as for the first solution.

3. Mount the component on hydrostatic pads. This could be made to function, but its failure mode of hydraulic pressure loss, due to leakage or electrical failure, is unacceptable.

4. Another possible solution would be to support the component with columns in which the top of the columns is a portion of a large diameter sphere. However, maintenance is difficult and could be required frequently. Also reliability is less than with the solution of the present invention.

5. Still another solution would be to support the component with columns in which the top of the column is a ball joint and the bottom of the column is a sector of a large diameter sphere. There will be less maintenance difficulty for this solution, but friction will be on the high side.

SUMMARY OF THE INVENTION

A support column for a heavy component of a liquid metal fast breeder reactor heat transport system which will deflect when the pipes leading coolant to and from the heavy component expand or contract due to temperature changes includes a vertically disposed pipe, the pipe being connected to the heavy component by two longitudinally spaced cycloidal dovetail joints wherein the distal end of each of the dovetails constitutes a part of the surface of a large diameter cylinder and the centerlines, that is the axes of curvature of these large diameter cylinders intersect at right angles and the pipe being supported through two longitudinally spaced cycloidal dovetail joints wherein the distal end of each of the dovetails constitutes a part of the surface of a large diameter cylinder and the centerlines, that is the axes of curvature of these large diameter cylinders intersect at right angles, each of the cylindrical surfaces bearing on a flat and horizontal surface.

BRIEF DESCRIPTION OF THE FIGURES

FIG. 3 is a vertical view, partly in section, of a support column according to the present invention.

FIG. 4 is a vertical view partly in section, of the top portion thereof.

FIG. 5 is a vertical section of the top portion of a column taken in the direction of the arrows in FIG. 4.

FIG. 6 is an isometric view, partly broken away, of one element of the joints.

DESCRIPTION OF THE PREFERRED EMBODIMENT

Figure 1:
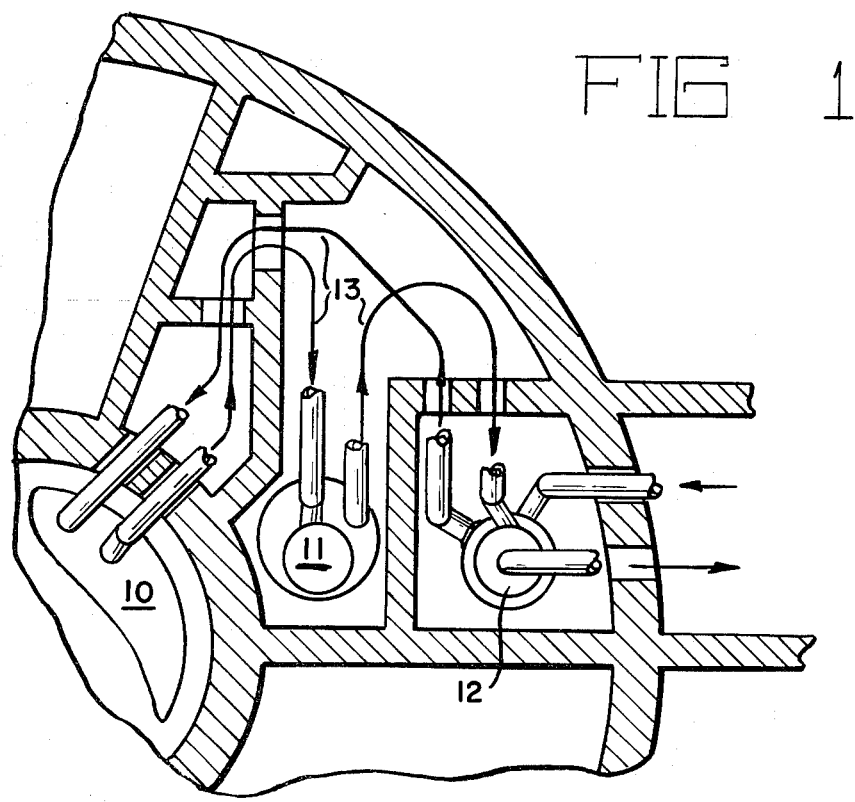
FIG. 1 is a sketch showing the layout of the Primary Heat Transport System of a LMFBR.
Figure 2:
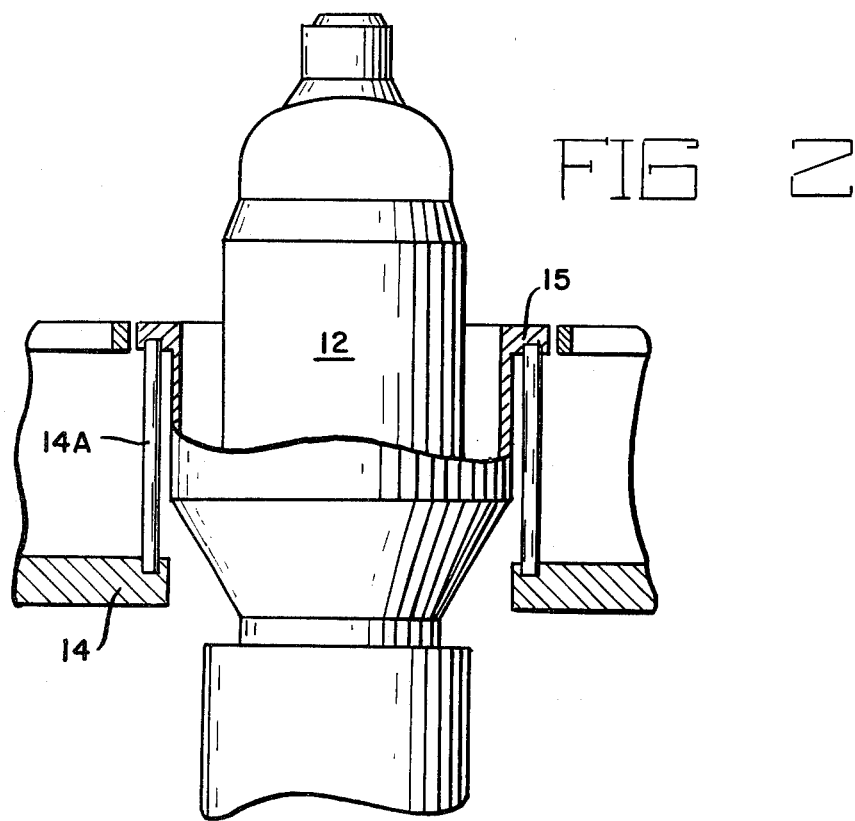
FIG. 2 is a sketch of the IHX forming a part therefor supported by support columns according to the present invention.

Reference is first made to FIG. 1 which shows the setting in which the support columns of the present invention are employed. The Primary Heat Transport System (PHTS) of a Liquid Metal Cooled Fast Breeder Reactor comprises a plurality of coolant loops—one only being shown in FIG. 1—incorporating reactor 10, pump 11, intermediate heat exchanger 12 and piping 13 connecting these components. It is necessary to support the pump 11 and IHX 12 so that the lateral force exerted by the pipe against the component due to thermal expansion of the pipe will be limited to a value that will not produce unacceptable stress in the pipe. As shown in FIG. 2, IHX 12 is supported from ledge 14 of the building structure by low friction columns 14A equally spaced beneath support flange 15 of IHX 12. Reference will now be made to FIGS. 3–6 for details of these columns.

Columns 14A comprise a 148" long 12 inch schedule 80 pipe 16 having end fittings 17 socketed into the ends thereof. Shoes 18 (see FIG. 6) are attached to end fittings 17 by cycloidal dovetail joints 19 and load pads 20 are attached to shoes 18 by cycloidal dovetail joints 21. The end fittings 17 are 440 C stainless steel, heat treated to 52 RC. End fittings 17 include a dovetail 22 whereof the distal surface of the dovetail is ground so that when assembled into the column, the ground surfaces constitute areas of the surface of a 158-inch diameter cylinder 10 inches long. The sides of the dovetail taper inwardly in a cycloidal curve.

The cylindrical surfaces of the end fittings 17 rest on ground plane horizontal surfaces at the base of slots 23 in the base of shoes 18, the sides of the slots being curved to conform to the curve of the sides of dovetail 22. Shoes 18 also include a dovetail 24 the distal surface of which is ground so that when assembled onto the end fittings, the ground surfaces constitute areas of the surface of a 168-inch diameter cylinder 10 inches long. The shoes also are of 52 RC 440 C stainless steel. Dovetails 22 and 24 are oriented so that the centerlines of the 158-inch and 168-inch cylinders just mentioned intersect at right angles.

The cylindrical surfaces of shoes 18 rest on ground plane horizontal surfaces at the base of slots 25 in the base of load pads 20, the sides of the slot being curved to conform to the curve of the sides of dovetail 24. It will be noted that the joints at the top and bottom of column 14A as thus far described are identical and that the cylindrical surfaces as described have the kinematic characteristics of spheres.

Lateral restraints 26 are fastened respectively to the sides of shoes 18 and load pads 20 within vertical slots 27 therein and extend therebelow into slots 23 and 25 to prevent respectively lateral movement of end fittings 17 and shoes 18 within dovetail joints 19 and 21. Top load pad 20 is provided with an integral flange 28 which rests on ledge 29 surrounding hole 30 in IHX support flange 15 and is attached to support flange 15 by screws 31. Adapters 32 at the bottom of the column are of steel and are champfered to permit easy entry of bottom load pads 20 during assembly and maintenance. Adapters 32 are attached to support structure 33 by screws (not shown).

Inspection and maintenance of the columns is simple, although none is anticipated. At replacement of a column, the screws in the top load pad are removed allowing the IHX to rest on the support structure. Then the entire column assembly down to the adapter can be pulled through the IHX flange. In like manner the column assembly can be lowered through the hole in the IHX flange at reinstallation.

The force required to move the IHX laterally is acceptably low. The contribution to the lateral force, due to rolling friction of the cylinders, is uncertain. With clean well finished surfaces it could be as low as 2 pounds, and if the surfaces become rusty it could be as high as 100 pounds. The contribution of the dovetail joints is about 5 pounds if a coefficient of friction of 0.3 is assumed and the IHX is off level by 0.170" from side to side of the 237" diameter column circle. The off level contribution is about 276 pounds. The total force required to move the IHX laterally is about in the range of from 2 to 380 pounds.

I claim:

1. A support column capable of limited lateral deflection upon application of a limited orthogonal force to the top thereof comprising an elongated pipe, means establishing two longitudinally displaced curved surfaces constituting part of the surfaces of two large diameter horizontal cylinders having horizontal axes of curvature intersecting at right angles, said curved surfaces extending horizontally across the column at top and bottom of the column, and means establishing two longitudinally displaced, plane, horizontal surfaces at top and at bottom of column, said curved cylindrical surfaces bearing on the plane, horizontal surfaces.

2. Support column according to claim 1, wherein said means for establishing said surfaces include end fittings socketed into the ends of the pipe, said end fittings having at the distal end thereof a first cylindrical surface, shoes having horizontal plane surfaces on the proximal end thereof and cylindrical surfaces on the distal end thereof and load pads having horizontal plane surfaces on the proximal end thereof.

3. Support column according to claim 2 wherein said elements possessing said horizontal plane and said cylindrical surfaces mate in cycloidal, dovetail joints.

4. A support column 14a capable of limited lateral deflection upon application of a limited orthogonal force to the top thereof comprising:
load pads 20 connected to the top and bottom of said column suitable for transferring load forces to said column;
an elongated pipe 16 disposed longitudinally between said load pads;
longitudinally inward dovetail joints 19 connected to said elongated pipe at the top and bottom thereof;
longitudinally outward dovetail joints 21 connected between said inward joints 19 and said load pads 20 to form a pair of dovetail joints interconnecting said pipe 16 to said load pads 20 at each end of said column 14a;
said longitudinally inward 19 and longitudinally outward 21 joints each comprising a dovetail 22, 24 fitted into a slot 23, 25, said dovetail and slot having conforming inwardly tapered side surfaces, said dovetail 22, 24 each having a curved distal surface constituting part of the curved surface of one of two large diameter cylinders, said slot 23, 25 having a plane horizontal base surface bearing against the curved distal surface of said dovetail 22, 24; and
said inward 19 and outward 21 dovetail joints in an interconnecting pairs of joints are with the curved distal surfaces of the inward 22 and the outward 24 dovetails defining said two large diameter cylinders each having a horizontal axis of curvature extending in a perpendicular direction to that of the other of said two cylinders.

5. The support column of claim 4 wherein the two axes of curvature of the respective cylinders defined by the curved surfaces of dovetais 22 and 24 intersect at right angles.

6. The support column of claim 5 wherein said interconnecting longitudinally inward 19 and longitudinally outward 21 dovetail joints comprise end fittings 17 socketed into the ends of said pipe 16, said end fittings 17 having a dovetail 22 with a first curved surface at the distal end thereof, shoes 18 having a slot 23 with a first horizontal plane surface at the slot's base on the proximal end thereof receiving said dovetail 22 with said first plane surface bearing against said first curved surface, said shoes 18 having a dovetail 24 with a second curved surface at the distal end thereof and further comprising load pads 20 provided with a slot 25 with a second horizontal plane surface at the slot's base on the proximal end of said pads 20 receiving said dovetail 24 with said second plane surface bearing against said second curved surface, said dovetails and slots having conforming side surfaces that taper inwardly in a cycloidal curve.

7. The support column of claims 1 or 4 wherein a plurality of said support columns are oriented vertically in supportive positions around a heavy component of a liquid metal cooled fast breeder reactor heat transport system.

* * * * *